May 7, 1963  H. R. FEICHTER ETAL  3,088,588
CERAMIC TILE
Filed June 3, 1960
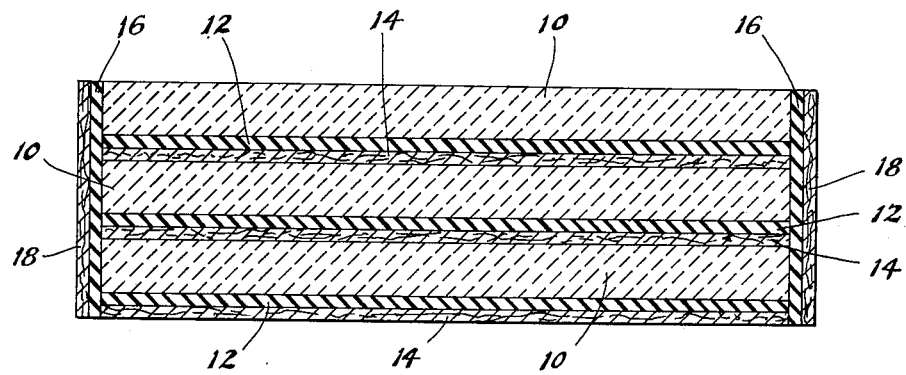
INVENTORS
Harold R. Feichter and
Ira A. Abernethy,
BY Diggins + Le Blanc
ATTORNEYS United States Patent Office 3,088,588
Patented May 7, 1963

3,088,588
CERAMIC TILE
Harold R. Feichter and Ira A. Abernethy, Canton, Ohio, assignors to United States Ceramic Tile Company, Canton, Ohio, a corporation of Delaware
Filed June 3, 1960, Ser. No. 33,750
3 Claims. (Cl. 206—65)

The present invention relates to ceramic tile, and more particularly to ceramic tile which is provided with its own adhesive and sealant on the back or on both back and edges.

Heretofore, ceramic tile has usually been sold as individual tiles or as assembled sheets, and the application of the tile to a floor, wall or other surface has involved preparation of the surface to be tiled, application of cement or other adhesive, preparation of the tile as by soaking in water, placing and positioning the tile in the cement or other adhesive, then grouting and finally cleaning the tile surface.

As a result of the numerous steps involved and the high degree of skill required in setting tile, installation of a ceramic tile surface has become quite expensive and ceramic tile has, to a certain extent, been replaced by rubber, asphalt and plastic tiles which are much easier to install and apply.

One of the objects of the present invention is to provide ceramic tile which may be directly installed on a surface without the need of applying a cement or other adhesive to the surface to be tiled.

Another object is to provide ceramic tile in which the need for grouting is eliminated.

A further object is to provide ceramic tile which may be quickly, readily and inexpensively applied to a surface.

A further object is to provide a ceramic tile assembly which may be easily and conveniently handled, both in shipment and in application.

A further object is to provide a method for preparing ceramic tile for quick and easy application.

A further object is to provide a method for making ceramic tile assemblies from which the individual tiles may be readily removed and quickly placed upon the surface to be tiled.

These and other objects and advantages reside in certain novel features of construction, arrangement and combination of parts and the steps and processes as will hereinafter be more fully set forth and pointed out in the appended claims.

Referring to the drawing:
The FIGURE is a vertical cross section of a tile assembly according to the present invention.

The present invention requires ceramic tile precisely dimensioned as to thickness, width and length, and is applicable to tiles of various types, including conventional glazed surface 4¼ x 4¼ wall tile.

The individual ceramic tiles 10 are first ground on the back surface to a uniform thickness and to provide a flat surface without ribs or other formations such as are conventionally used when tile is to be adhered to a wall or other surface by conventional cement or adhesives. The side edges of the tile 10 are then ground to precise dimensions to form a substantially flat, vertical edge.

After the tile 10 has been formed to proper size, the back surface of the tile is coated with a pressure-sensitive moisture-resistant adhesive such as a polyvinyl ether, polyvinyl pyrollidone-vinyl acetate copolymer, silicone, or natural or synthetic rubber, indicated at 12, and a layer of paper or other material 14 is placed over the adhesive coated surface. Specifically, an adhesive consisting of a polyvinyl ether base has been found to be excellent and it maintains its adhesive properties after long periods of storage. The paper is treated with a suitable release agent such as silicone so that it will not permanently adhere to the adhesive 12, or materials such as mylar or polyethylene, which do not permanently adhere to the adhesives, may be used.

The tiles with the adhesive and paper backing are then placed in suitable stacks (a three-tile assembly is shown in the drawing), and these stacks may be of any size for convenient handling.

In the preferred embodiment, the edges of the stacked tiles are then coated with a pressure-sensitive adhesive 16 and the adhesive layer 16 is covered by a layer of paper or other material 18 which will not permanently adhere to the adhesive layer 16. The tile assemblies are then ready for shipment and for installation.

In applying the tile of the present invention, the outer layer of paper or other material 18 is first stripped from the assembly and the individual tiles may then be separated because the paper layer 14 prevents adhesion between one tile and the next tile below it in the stack.

After the top tile 10 is removed, the paper backing 14 is stripped off and the tile is firmly pressed against the surface to be tiled. The pressure-sensitive adhesive forms a strong bond between the tile and the surface, and since the back of the tile is flat, the adhesion is substantially uniform over the entire back surface.

Where the second tile is to be placed next to the first, the paper backing is stripped from the second tile and the second tile is placed in close edge-to-edge relationship with the first and then pressed firmly against the surface.

As shown in the drawing, the relative thickness of the adhesive and paper layers is somewhat exaggerated for the purpose of clarity, but in practice, the layer of adhesive, both on the back and edge of the individual tiles, is quite thin. Because the edge layer of adhesive 16 is quite thin and is, at the time of application, somewhat plastic, the adjacent tiles 10 may be pressed into very close edge-to-edge relationship so that there is substantially no grouting space between adjacent tiles.

When the adhesive-coated tile is placed in position on the surface being tiled, a strong water-tight bond is formed between adjacent tiles and between each individual tile and the tiled surface.

It is also possible to omit the edge coating of adhesive and apply the adhesive and paper backing only to the rear face. The tiles are set as described above with the edges in closely abutting relation and the small space between the tile edges may be filled with a suitable sealant.

From the foregoing it will be apparent that the objects of the invention have been attained and a new and improved ceramic tile provided. Various modifications can, of course, be made without departing from the spirit of the invention or the scope of the appended claims.

We claim:
1. A tile assembly comprising a plurality of tiles each of which has a face area, a back area and edges; said back and edges being finished to provide smooth surfaces, said tiles being assembled with their face areas in superposed relationship to one another and with the edges of each tile being substantially in a common plane with the corresponding edges of the other tiles in said assembly; each tile having an adhesive material on its back surface and a removable mask over said adhesive material; the mask of each tile abutting the immediately adjacent tile in said tile assembly and precluding the adhesion of said tiles to one another; the corresponding edges of all of said tiles having adhesive material thereon; and at least one removable mask covering said edges and adhered to said tile by means of the adhesive on said edges.

2. A tile assembly as defined in claim 1 wherein said tiles are ceramic.

3. A tile assembly as defined in claim 1 wherein said removable masks are paper which has been treated with a release agent to facilitate their removal from the adhesive to which they are attached.

References Cited in the file of this patent

UNITED STATES PATENTS

| | | |
|---|---|---|
| 2,020,455 | Butler | Nov. 12, 1935 |
| 2,637,995 | Mann | May 12, 1953 |
| 2,878,666 | Drummond | Mar. 24, 1959 |
| 2,885,073 | Bettoli et al. | May 5, 1959 |